United States Patent [19]

McAdams, Sr.

[11] Patent Number: 4,468,064

[45] Date of Patent: * Aug. 28, 1984

[54] ANTI-THEFT MECHANISM FOR REMOVABLE AUTOMOBILE ROOF PANEL

[76] Inventor: Luther J. McAdams, Sr., 612 E. 75th St., Chicago, Ill. 60619

[*] Notice: The portion of the term of this patent subsequent to Nov. 24, 1998 has been disclaimed.

[21] Appl. No.: 369,626

[22] Filed: Apr. 19, 1982

Related U.S. Application Data

[63] Continuation-in-part of Ser. No. 277,067, Jun. 25, 1981, abandoned.

[51] Int. Cl.³ .............................................. B60J 7/18
[52] U.S. Cl. ...................................... 296/224; 70/167
[58] Field of Search .................. 296/218, 224; 70/163, 70/167, 168

[56] References Cited

U.S. PATENT DOCUMENTS

| | | | |
|---|---|---|---|
| 2,222,667 | 11/1940 | Kitzelman | 20/71 |
| 2,223,876 | 12/1940 | Scanlan | 70/91 |
| 2,575,401 | 11/1951 | Simmons | 70/211 |
| 2,613,525 | 10/1952 | Holmsten | 70/89 |
| 2,877,637 | 3/1959 | Greenwald | 70/168 |
| 3,154,937 | 11/1964 | Reeves | 70/163 |
| 3,426,932 | 2/1969 | Rouse | 70/167 |
| 3,534,570 | 10/1970 | Mauro | 70/167 |
| 3,603,636 | 9/1971 | Carella et al. | 296/137 B |
| 3,610,681 | 10/1971 | Trenkler | 295/137 R |
| 3,699,787 | 10/1972 | Corrado | 70/167 |
| 3,704,563 | 12/1972 | Waller | 52/455 |
| 3,712,665 | 1/1973 | Klein | 296/137 R |
| 3,818,731 | 6/1974 | Waling et al. | 70/232 |
| 3,913,971 | 10/1975 | Green | 296/137 B |
| 3,975,935 | 8/1976 | Masterson | 70/232 |
| 4,093,256 | 6/1978 | McAdams, Sr. | 280/153 R |
| 4,095,841 | 6/1978 | Thompson et al. | 296/137 B |
| 4,121,870 | 10/1978 | Oakey | 296/137 B |
| 4,302,045 | 11/1981 | McAdams, Sr. | 296/224 |

Primary Examiner—Joseph F. Peters, Jr.
Assistant Examiner—Ross Weaver
Attorney, Agent, or Firm—Kinzer, Plyer, Dorn & McEachran

[57] ABSTRACT

An anti-theft mechanism for a handle operated latching mechanism of a removable automobile roof panel of the type in which the handle is located in a recessed well in the panel trim molding and the handle pivots to latch and unlatch the panel. The anti-theft mechanism includes a keeper plate. The keeper plate is curved laterally so that it extends substantially the entire length of the well and conforms closely to the contour of the panel molding to prevent access to the handle in the recessed well. In a modification, the keeper plate forms the top, front and end walls of a housing which is seated in the recessed well and encloses the handle.

2 Claims, 9 Drawing Figures

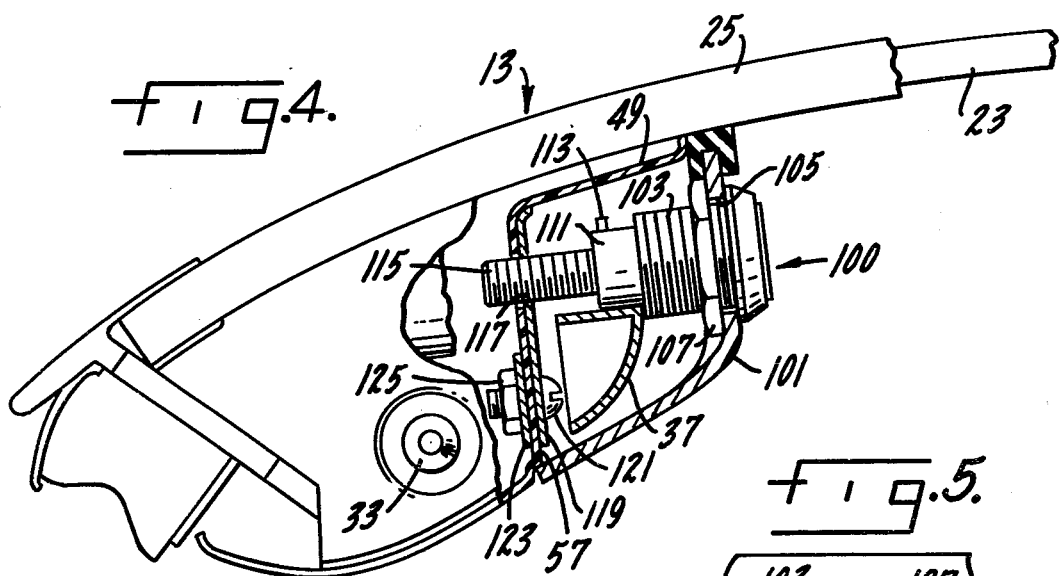

ANTI-THEFT MECHANISM FOR REMOVABLE AUTOMOBILE ROOF PANEL

This is a continuation-in-part of my co-pending application, Ser. No. 277,067, filed June 25, 1981, now abandoned.

Summary of the Invention

This invention is an improvement to my anti-theft mechanism for removable automobile roof panels shown and described in my U.S. Pat. No. 4,302,045. My present invention is generally concerned with an anti-theft mechanism for an automobile roof panel which has a handle operated latching mechanism of the type in which the handle pivots to latch and unlatch the panel relative to the automobile roof. Depending upon the make of automobile, the handle pivots in a plane parallel to the plane of the roof panel or at right angles thereto. My invention is particularly concerned with a handle of the type which is located in a well or recess in the roof panel trim molding and which handle is fastened to its operating shaft by a readily accessible screw which can easily be removed.

An object of this invention is an anti-theft mechanism for the handle of a removable automobile roof panel that not only prevents unauthorized operation of the handle but also prevents access to the handle for tampering and/or prying.

Another object of this invention is an anti-theft mechanism for a handle operated roof panel in which the anti-theft mechanism is contoured to blend in with the panel trim molding.

Another object of the invention is an anti-theft mechanism in which the locking means is permanently attached to the keeper plate.

Another object of this invention is an anti-theft mechanism having a keeper plate which can be drawn up tightly in its closed position to prevent rattling.

Another object of the invention is an anti-theft mechanism in the form of a housing which fits in the recessed wall in the roof panel trim molding and completely encloses the handle with the keeper plate capable of being drawn up tightly against the housing.

Other objects may be found in the following specification, claims and drawings.

BRIEF DESCRIPTION OF THE DRAWINGS

The invention is illustrated more or less diagrammatically in the following drawings wherein:

FIG. 4 is a cross-sectional view similar to that of FIG. 3 but showing a modified embodiment of my invention;

FIG. 5 is a partial front view of the mechanism of FIG. 4;

FIG. 6 is a cross-sectional view similar to that of FIG. 3 but showing yet another modified embodiment of my invention; and FIG. 7 is a partial front view of the mechanism of FIG. 6.

FIG. 8 is a view similar to that of FIG. 2 but showing yet another modified embodiment of my invention; and FIG. 9 is an end view of the embodiment of FIG. 8 on an enlarged scale with parts shown in dashed lines and broken away for clarity of illustration.

DESCRIPTION OF THE PREFERRED EMBODIMENT

Figure 1:
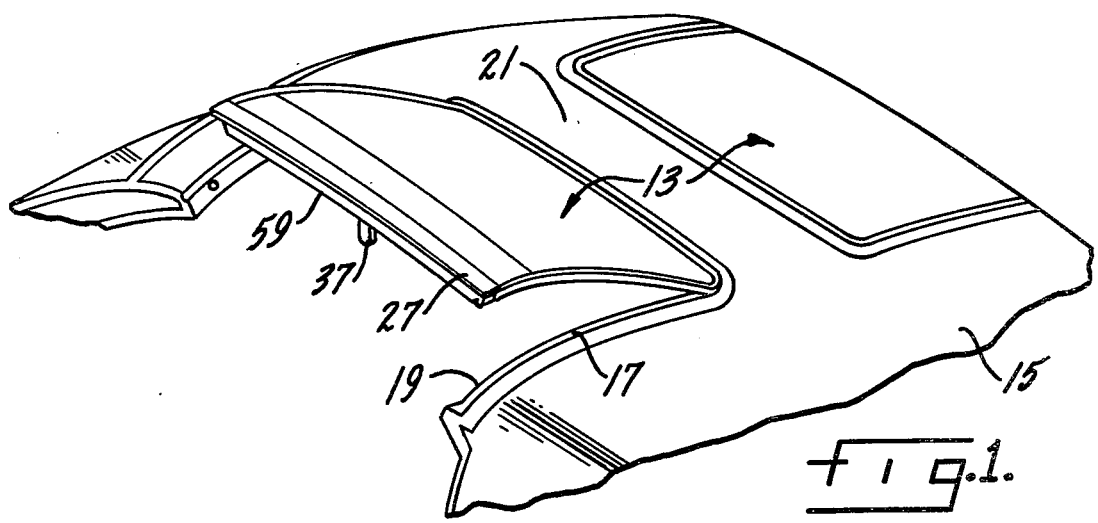
FIG. 1 is a partial perspective view of an automobile equipped with removable roof panels, with one panel shown in a partially open position and the other panel shown in its closed position.

The anti-theft mechanism 11 of my invention is intended for use with removable roof panels 13 of the type shown in FIG. 1 of the drawings. Such roof panels are installed on opposite sides of an auto roof 15 above the doors. Each roof panel is intended to be lifted into and out of a channel 17 formed around an opening 19 in the roof. The typical two door sports type automobile has one panel on each side of the roof with the openings for the panel separated by a longitudinally extending portion 21 of the roof which separates the roof into a somewhat T-shaped configuration. From this construction, such automobiles have acquired the name, T-bar roof automobiles.

A typical roof panel 13 is formed of a generally rectangular sheet of glass 23 which is usually tinted and is slightly curved both longitudinally and laterally in order to conform to the contour of the roof of the automobile in which it is installed. The inner and side edges of the sheet of glass fit in a U-shaped metal channel 25 and an elongated metal extrusion 27 is fastened to the outer edge of the sheet of glass and to the edges of the channel 25.

A handle operated latching mechanism 31 is mounted on the center of the metal extrusion 27. This latching mechanism operates throw rods 33 which extend towards the opposite sides of the roof panel. The throw rods extend through and are guided by brackets 35 also mounted on the metal extrusion 27. A handle 37 is provided for operating the latching mechanism.

Figure 3:
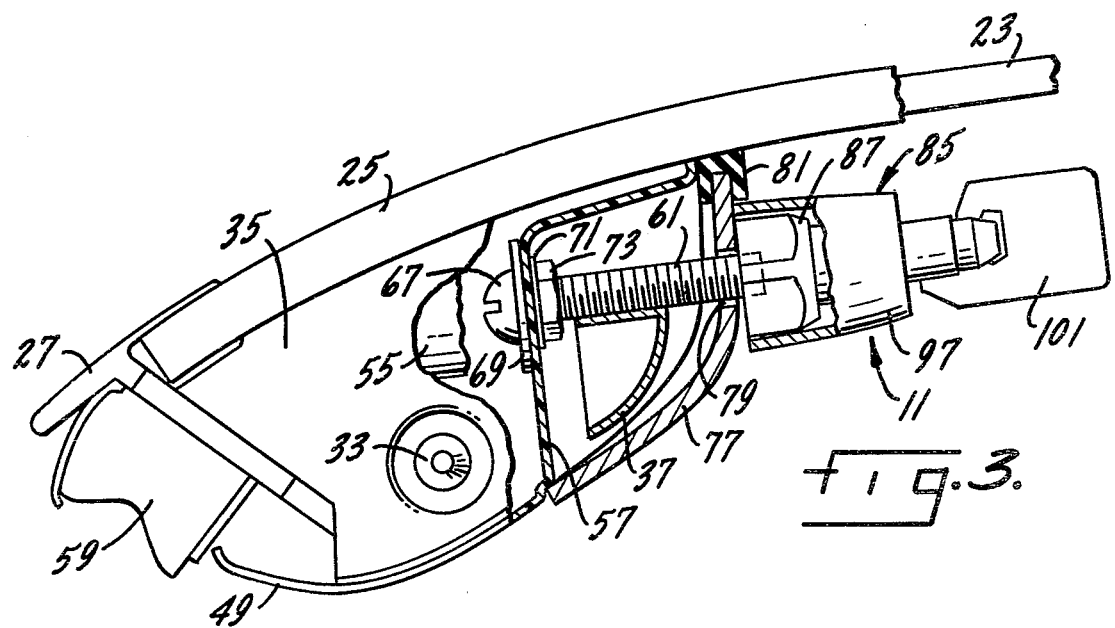
FIG. 3 is an enlarged cross-sectional view taken along line 3—3 of FIG. 2 with parts broken away and others shown in cross-section.

The roof panels 13 are pivotally mounted relative to the auto roof 15 by means of plastic inserts (not shown) which fit into openings (not shown) in the channel 25. Each plastic insert has a recess which receives a tab formed in the channel 17 of the auto roof. When the tabs are seated in the recesses of the inserts, the panels are held in place by the extended throw rods 33 of the latching mechanism. Some automobile manufacturers provide a roof panel having a handle on each side for each latch or throw rod while other manufacturers provide a panel with one handle which operates throw rods on opposite sides of the roof panel. The latter construction is shown in the drawings. Some automobile manufacturers provide a handle which pivots in a plane extending at right angles to the plane of the sheet of glass 23, as shown in FIG. 3, which other manufacturers provide a handle which pivots in a plane parallel to the plane of the glass. My invention is adaptable to all of these types of handle operated latching mechanisms.

Automobile manufacturers do not presently provide a locking mechanism to prevent unauthorized operation of the latching handles and subsequent removal of the panels from the automobile roof. A would-be thief need only gain entrance to such an automobile and there is nothing to prevent the thief from removing a roof panel simply by operating the latching handle. The anti-theft mechanism 11 of this invention is designed to be readily applicable for non-factory installation on all types of automobile roof panels having latch handles which pivot during latching and unlatching of the roof panels. Of course, it is also adaptable to factory installations by the auto manufacturers.

For appearance sake, the metal extrusion 27, the handle operated latching mechanism 31 and the throw rod mounting brackets 35 are enclosed by a plastic trim molding or housing 49 which is fastened to the extrusion by screws 51. The opposite ends of the trim molding 49 are opened to permit reciprocal movement of the throw rods 33. An opening (not shown) is formed in the trim molding to receive the shaft 55 of the handle operated latching mechanism. The handle 37 is affixed to the shaft 55 by a screw which is not shown in the drawings. The opening for the shaft 55 is located in a recess or well 57 molded in the surface of the plastic trim molding. The recess is sufficiently long to receive the handle 37. The outer surface of the plastic trim molding 49 is arcuate shaped. A gasket 59 is attached to the extrusion to form a weather type seal between the roof panel 13 and the top of the window in the door of the automobile.

Figure 2:
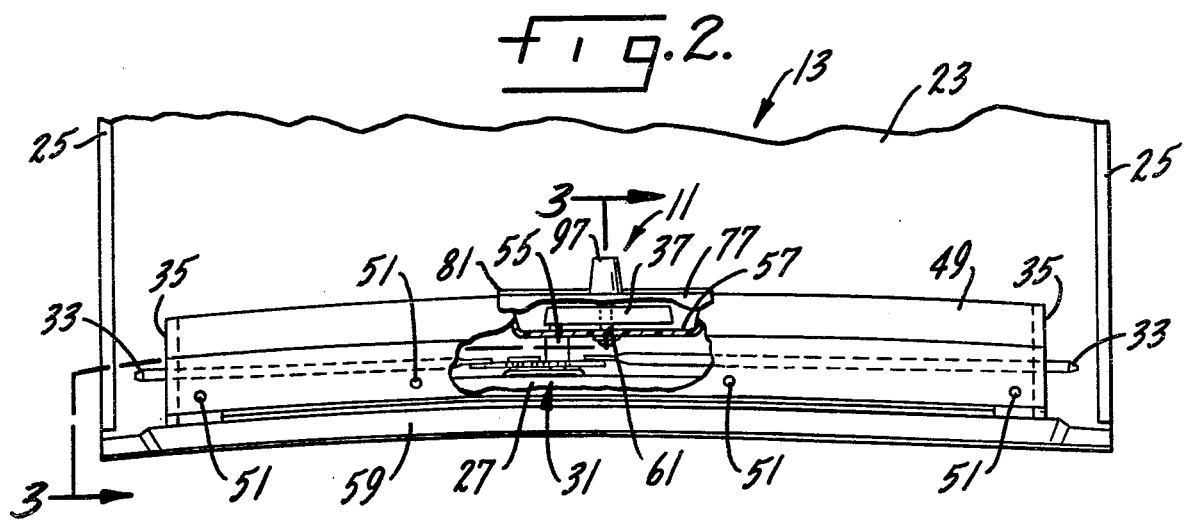
FIG. 2 is a partial underside plan view of the outer end of a roof panel showing the anti-theft mechanism of this invention with portions thereof broken away to show the latching mechanism of the roof panel.

One embodiment of the anti-theft mechanism of my invention is shown in FIGS. 1 through 3 of the drawings and includes a post 61, usually threaded, which extends through an opening (not shown) formed in the recess 57 of the plastic trim molding 49. The post in this embodiment is a bolt having a head 67. The head and one or more washers 69 engage the underside of the recess of the trim molding. Additional washers 71 and one or more nuts 73 fit over the post and engage the upper surface of the trim molding to hold the post in position. The post extends upwardly above the top surface of the plastic trim molding 49.

A metal keeper plate 77 is formed from a thin rectangular piece of metal, preferably a hardened, aluminum alloy, and is formed with an arcuate bend in lateral cross section to conform to the contour of the outer surface of the plastic trim molding 49. The keeper plate is formed having sufficient length and width to completely enclose the recess 57 in the plastic trim molding. An opening 79 is formed in the keeper plate to fit over and receive the post 61. When the keeper plate is fitted over the post 61, it completely encloses the recess or well 57 to prevent both access to the latching mechanism handle 37 and pivotal opening movement thereof. A channel shaped gasket 81 fits over the upper longitudinal edge of the keeper plate to eliminate rattling and prevent damage to the plastic trim molding 49 and the glass 23. The keeper plate is held in position on the post 61 by a commercially available locking mechanism 85.

The locking mechanism 85 shown in the drawings and described herein is manufactured by the Fort Lock Company of Chicago, Ill. The locking mechanism includes a special nut 87 formed with an axial chamber closed at the bottom by a wall. A threaded opening is formed in the bottom wall and this threaded opening engages the post 61. An annular groove is formed internally near the top of the axial chamber of the nut. When the nut 87 is threaded onto the post and against the keeper plate 77, access is blocked to the handle operated latching mechanism 31 of the roof panel. To prevent removal of the nut 87, the commercially available locking mechanism provides a key operated tubular cap 97 which fits over and completely encloses the nut 87. The cap 97 includes a lock which is operated by a special circular key 101. When the circular key is inserted in the lock and rotated, fingers extend radially into and out of the internal annular groove of the nut 87. This prevents the tubular cap 97 from being moved axially away from the nut but permits the cap to be rotated relative to the nut. Thus, this locking mechanism prevents removal of the nut 87 and also prevents a would-be thief from using a pipe wrench or other implement to break or loosen the locking mechanism 85.

It should be understood and appreciated that the invention is not limited to the use of the commercially available locking mechanism 85 but can be used with other types of locking mechanisms which can be adapted to prevent removal of the keeper plate 77 from the post 61.

Another embodiment 100 of my invention is shown in FIGS. 4 and 5 of the drawings in which the parts of the roof panel 13 are identical to those shown and described in FIGS. 1 to 3 of the drawings. The keeper plate 101 of this embodiment is similar in size and shape to keeper plate 77 of the previously described embodiment but in addition has a tubular lock housing 103 inserted in an opening 105 extending through the plate. The lock housing is secured in the opening by a nut 107 which is drawn up against the underside of the keeper plate. A key operated lock plug 111 fits into and extends through the lock housing. A pin 113 projecting from the lock plug prevents removal of the lock plug from the lock housing 103. A threaded rod 115 is affixed to the inner end of the lock plug. The rod 115 is engageable with the threads of an opening 117 formed in a metal plate 119 which is mounted against the upper surface of the recess 57 adjacent the operating handle 37. The metal plate is held in position by two or more screws 121 which extend through the metal plate 119, the trim molding 49 and a plate 123 located beneath the recess 57 and engage nuts 125.

As is conventional, the lock plug 111 cannot be rotated relative to the lock housing unless the correct key is inserted in its keyhole 127. Also, the lock plug cannot be removed from the lock housing because of the pin 113. The lock plug and its attached rod 115 can be rotated to either thread the rod into or remove it from engagement with the threaded opening 117 in the metal plate 119. When the rod is inserted in the opening 117, the keeper plate 101 completely encloses the recess 57 and prevents access to the operating handle 37. When the threaded rod is removed from engagement with the threaded opening 117 in the metal plate, the keeper plate can be removed from engagement with the plastic trim molding 49, permitting access to the operating handle. An advantage of this construction is that the lock plug and lock housing remain with the keeper plate when it is removed from its handle protecting position. Additionally, the ability to thread the rod 115 into the metal plate 119 by rotation of the lock plug 111 enables the keeper plate to be tightly drawn against the trim molding to eliminate rattling.

Yet another embodiment 130 of my invention is shown in FIGS. 6 and 7 of the drawings in which the parts of the roof panel 13 are identical to those shown and described in FIGS. 1 to 3 of the drawings. This embodiment is identical in most respects to the embodiment 100 shown in FIGS. 4 and 5 except that the lock housing and key operated lock plug of this embodiment are of a different construction. In the embodiment of FIGS. 6 and 7, the tubular lock housing 131 and the key operated lock plug 133 are of the type manufactured and sold by the Chicago Lock Company under the trademark "ACE". Locks of this type are pick-resistant and require a distinctive circular key. The lock plug is rotatable when a suitable circular key is inserted into the key hole 135 of the lock plug, moved axially inward and rotated. Rotation of the lock plug and its attached threaded rod 137 permits the fastening and removal of the keeper plate from its enclosing position over the trim molding well 57. It also enables the keeper plate to be tightly drawn against the trim molding to eliminate rattling.

Still another embodiment 141 of my invention is shown in FIGS. 8 and 9 of the drawings. In this embodiment, a metal keeper plate 143 forms the front, top and side walls of a metal housing 145 which seats in the recess 57 of the plastic trim molding 49. The housing also includes an elongated base 147 of somewhat L-shaped lateral cross section. The base has a wall 149 which engages a rear wall of the recess 57 and a bottom wall 151 which engages the bottom wall of the recess. The base is fastened to the plastic trim molding by two or more screws 153 which extend through openings in the bottom wall 151 of the housing base, through openings in the trim molding 49 and through openings in a metal plate 155 located beneath the recess bottom wall. The screws are held by nuts 157.

The metal keeper plate 143 is formed with an arcuate bend in lateral cross section to form a top wall 161 and a front wall 163. Walls 165 are located at the opposite ends of the keeper plate. A downturned flange 167 on the top wall 161 fits behind a bend 169 formed in the wall 149 of the base and the end of the front wall 163 of the keeper plate fits inside a lip 171 at the outer end of the bottom wall 151 of the housing base.

The lock housing and key operated lock plug may be of the type shown in the embodiment of FIGS. 4 and 5 or in the embodiment of FIGS. 6 and 7. In each case, the lock plug is rotatable when a suitable key is inserted in the key hole, manipulated if necessary, and rotated. Rotation of the lock plug and its attached threaded rod 173 permits the attachment and removal of the keeper plate 143 from its enclosing portion of the housing 145. It also enables the keeper plate to be tightly drawn against the housing to eliminate rattling. The housing and its keeper plate are highly resistant to prying because of the close interfit of its parts especially because the end of the front wall 163 of the keeper plate fits inside the lip 171 at the outer end of the bottom wall 151 of the housing base and the downturned flange 167 on the top wall of the keeper plate fits behind the bend 169 formed in the back wall 149 of the housing base.

I claim:

1. An anti-theft mechanism for a handle operated latching mechanism of a removable automobile roof panel of the type in which the handle is located in a recessed well in the panel trim molding, an opening leads into the well, and the handle pivots to latch and unlatch the panel, the mechanism including:
   - a base having a bottom wall and a back wall, which walls engage and conform to the bottom and back walls respectively of the panel trim molding well,
   - means to attach the base to the panel trim molding,
   - a threaded opening in the base aligned with an opening in the panel trim molding,
   - a cover having a top wall and a front wall, which walls are formed to engage the back and bottom walls of the base and to be generally flush with the surface of the panel trim molding surrounding the well opening,
   - an opening in the cover,
   - a tubular lock housing extending through the opening in the cover and fastened thereto, and
   - a key operated lock plug located in the lock housing and having a threaded rod which is engageable with the threaded opening in the base,
   - the lock plug being rotatable relative to the lock housing only when a key is inserted in the lock plug to permit engagement and disengagement of the threaded rod with the threaded opening upon rotation of the lock plug to thereby attach and detach the cover from the base and to tighten the cover into locking engagement with the base.

2. An anti-theft mechanism for a handle operated latching mechanism of a removable automobile roof panel of the type in which the handle is located in a recessed well in the panel trim molding, an opening leads into the well, and the handle pivots to latch and unlatch the panel, the mechanism including:
   - an elongated keeper plate having a configuration conforming generally to the opening into the recessed well and shaped to closely conform to the contour of the panel trim molding surrounding the recessed well to prevent access to the handle when mounted on the panel trim molding and covering the opening into the recess well, and
   - means to lock the keeper plate in its mounted position including a threaded post secured against axial movement relative to the handle and positioned adjacent the handle,
   - an opening in the keeper plate which slidably receives the threaded post, which opening is sized relative to the post to prevent lateral movement of the keeper plate relative to the post, and
   - a key operated means engageable with the post to prevent removal of the keeper plate from the post and disengageable with the post to permit removal of the keeper plate from the post.

* * * * *